UNITED STATES PATENT OFFICE.

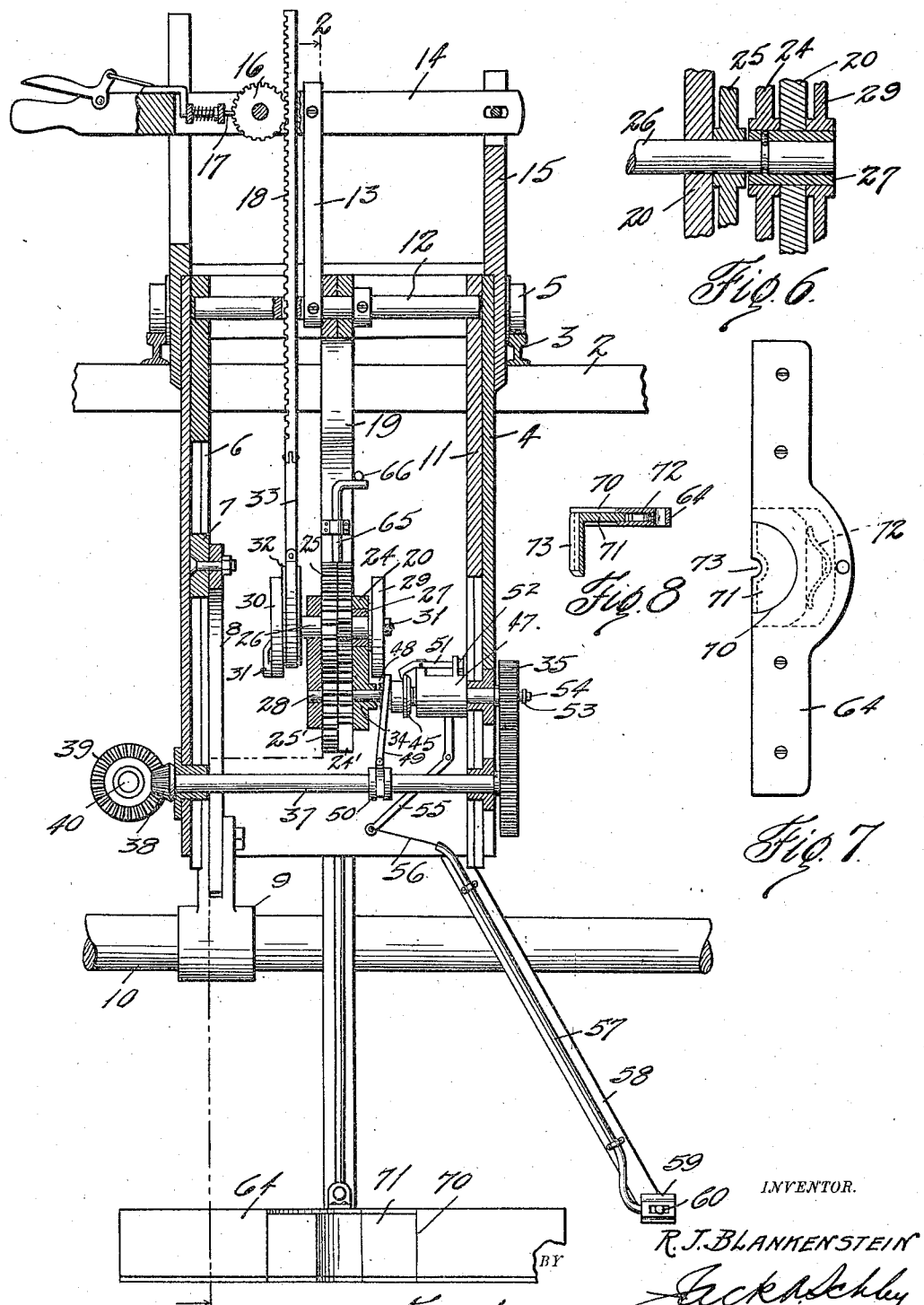

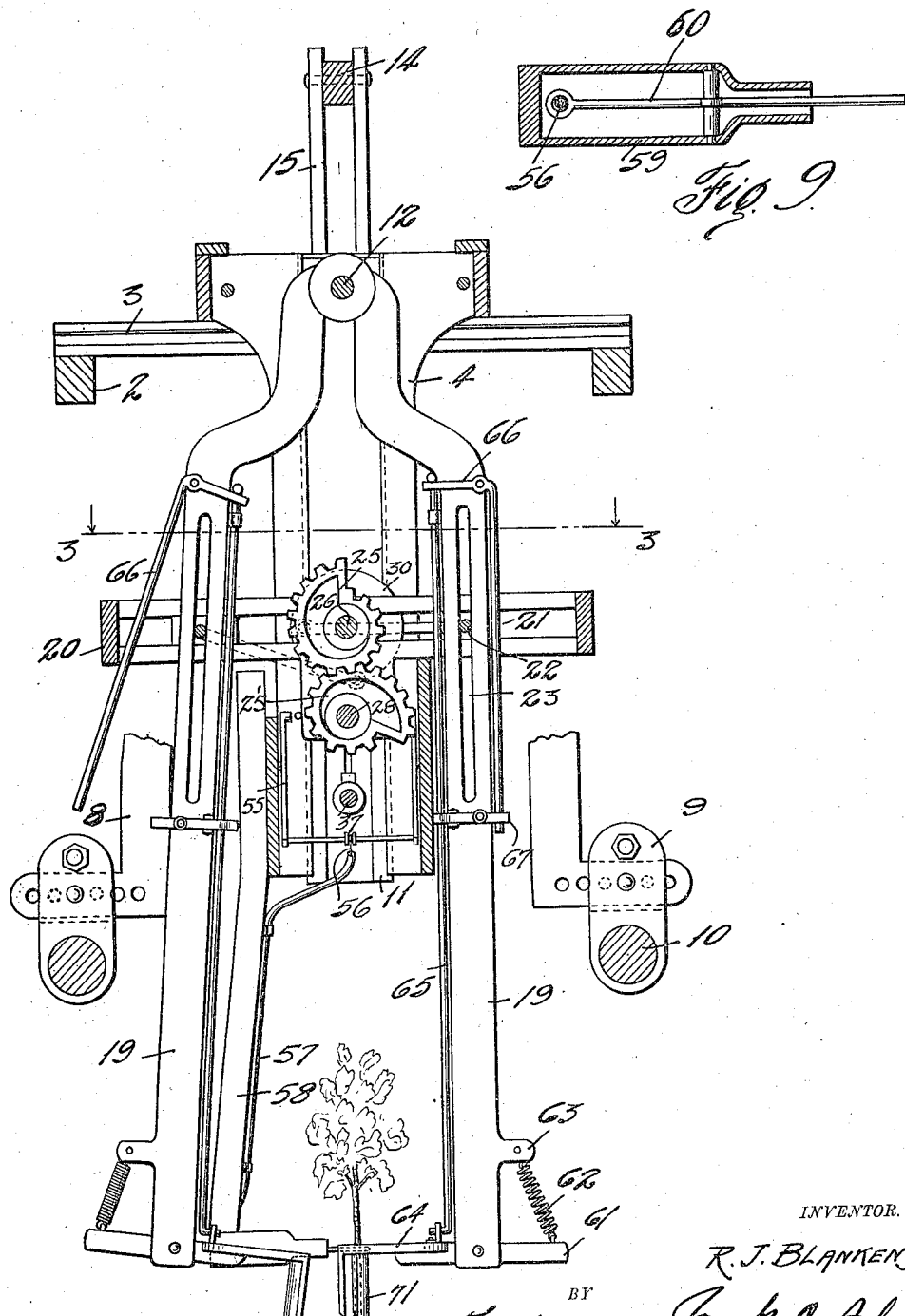

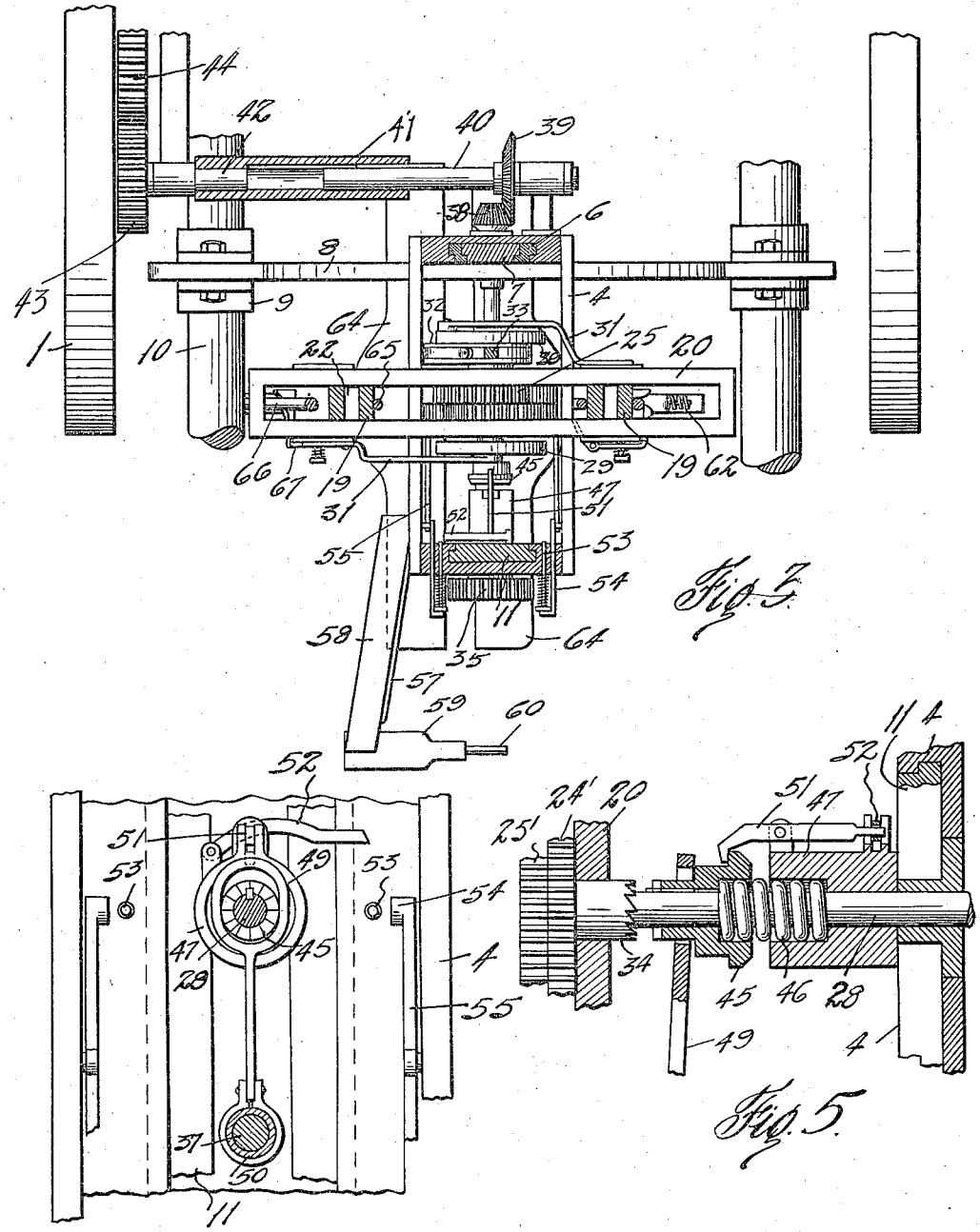

RICHARD J. BLANKENSTEIN, OF CLEBURNE, TEXAS, ASSIGNOR OF ONE-FOURTH TO WILLIAM H. BAADE, OF WACO, TEXAS.

HOEING AND CHOPPING APPARATUS.

1,299,902. Specification of Letters Patent. Patented Apr. 8, 1919.

Application filed July 1, 1918. Serial No. 242,740.

*To all whom it may concern:*

Be it known that I, RICHARD J. BLANKENSTEIN, a citizen of the United States, residing at Cleburne, in the county of Johnson and State of Texas, have invented certain new and useful Improvements in Hoeing and Chopping Apparatus, of which the following is a specification.

This invention relates to combined chopping and hoeing apparatuses.

The invention contemplates an apparatus which may be mounted on a cultivator frame moved laterally with the gang. One of the main features of the machine is an automatic release and operating means which includes a tripping device carried in the path of the plants and operated thereby to release the operating means so as to chop out the plants at intervals. The chopping hoes are arranged to clean out the row but leave a plant standing after each operation. By changing the hoe the row may be chopped or cleaned out close around the plant.

In carrying out the invention a frame is mounted on supports transversely of a cultivator frame so that the frame may move laterally when attached to the gangs. A pair of transversely swinging members are pivoted in the frame and vertically adjustable therein. Elements are provided for swinging or oscillating the members so that tools carried on their ends will coöperate. To do this the members must be swung so that one of the tools reaches the center of the row and starts its return movement before the tool arrives at the center. The tools are pivoted on the bottom of the members so as to be carried to the center of the row and then depressed to engage in the soil. The elements are driven from the ground wheels of the cultivator and a clutch device is interposed, normally interrupting the transmission of motion. A tripping device is carried in the path of the plants and is sensitive enough to be operated when striking the same. This tripping device releases the clutch and causes the operating members to perform one operation after which the clutch is again disengaged.

The invention will be more readily understood from a reading of the following specification and by reference to the accompanying drawings, in which an example of the invention is illustrated, and wherein—

Figure 1 is a longitudinal vertical sectional view of an apparatus constructed in accordance with this invention, Fig. 2 is a transverse vertical sectional view taken on the line 2—2 of Fig. 1, Fig. 3 is a horizontal cross sectional view taken on the line 3—3 of Fig. 2, Fig. 4 is a detail view of part of clutch operating means, Fig. 5 is a sectional detail view of same, Fig. 6 is a sectional detail of the gear sleeve mounting, Fig. 7 is a plan view of one of the hoes, Fig. 8 is a transverse vertical sectional view of the same, and Fig. 9 is a sectional detail of the tripping arm and its housing.

In the drawings the numeral 1 designates the ground wheels of a cultivator and 2 the side bars of the same.

In applying my attachment I mount a pair of rails transversely of the cultivator with their ends fastened on said bars. Between the rails a frame 4 is hung on wheels 5 which rest on the rails. The frame depends below the bars and may slide laterally or transversely of the cultivator. In the rear wall of the frame a vertical slide 6 is confined and within this slide a block 7 is arranged to slide vertically. This block is pivoted to the center of a yoke 8 extending transversely of the cultivator and having adjustable action with collars 9 fastened on the beams 10 of the gangs. It will be seen that if the gangs move vertically the yoke 8 may also move vertically and when the gangs move laterally in following the row the frame 4 is also moved laterally so that its center is over the row.

In the front wall of the frame a vertical slide 11 is mounted and with the slide 6 supports the ends of a bar 12 which is fastened to the lower ends of links 13. The links 13 are pivoted at their upper ends to opposite sides of a lever 14 having its forward ends pivoted in an extension 15 of the frame 4. The lever extends rearwardly and carries a pinion 16 which is engaged by a spring pressed locking plunger 17. The pinion meshes with a vertical rack bar 18 slidable through the lever, said bar extending down through a slot in the bar 12.

Operating members 19 depend on each side of the frame and have their upper ends curved inward and pivoted on the bar 12. It will be seen that when the lever 14 is swung the bar 12 will be raised and lowered, thus raising and lowering the members, but to do this the pinion 16 must be released so as to roll on the bar 18. A transverse guide frame 20 is carried by the frame 4 and receives sliding blocks 21 carrying transverse pins 22 which also pass through vertical slots 23 in the members 19. Within the frame 20 at the center of the frame 4 is mounted a pair of scroll gears 24 and 25 respectively. As shown in detail in Fig. 6 gear 25 is mounted on a shaft 26 while the gear 24 is mounted on a sleeve 27 which is rotatively confined on the shaft 26. By this arrangement the gears 24 and 25 may revolve independently. Companion scroll gears 24' and 25' mesh with the gears 24 and 25 respectively and are loose on a shaft 28 suitably supported under the frame 20.

The sleeve 27 has fixed on its outer end a disk 29 while a similar disk 30 is mounted on the end of the shaft 26. These disks transmit reciprocating motion by means of pitmen 31 to the pins 22 whereby the members 19 are swung laterally. By the scroll gears a regular movement may be had and the gears are so arranged and timed that one of the members 19 will reach the limit of its inward stroke and start its return stroke prior to the time at which the other member arrives at the limit of its inward stroke, although both members will reach the limit of their outward stroke at substantially the same time. On the shaft 26 between the disk 30 and the frame 4 an eccentric 32 is fastened and has pivoted connection by means of a link 33 with the lower end of the bar 18. Thus when the gear 24 and 25 are revolved not only will the members 19 be swung laterally but they will also be moved vertically during the same time. This will impart to the lower ends of the members 19 a motion simulating the natural hoeing motion of a man in hoeing a row of plants.

The gears 24 and 25 are fastened together and loosely confined on the shaft 28. These gears have a common clutch hub 34 as shown in detail in Fig. 5. The shaft 28 extends through the front wall of the frame 4 and has fixed on its projecting end a pinion 35 which is driven by a gear 36 positioned thereunder and mounted on a shaft 37 extending through the frame 4 and carrying a beveled pinion 38 on its rear end which is driven by a beveled gear 39. As shown in Fig. 3 the gear 39 is mounted on a shaft 40 which is splined in a sleeve 41 attached to a drive shaft 42, supported on the cultivator frame and carrying a pinion 43 driven by a gear 44, which in turn is driven by one of the wheels 1. It will be seen that when the cultivator is moving the shafts 28 and 37 will be constantly rotated. In order to transmit motion to the hub 34 a clutch collar 45 is splined on the shaft 28 and forced into engagement with the hub by a coiled spring 46 which is seated in a bearing block 47 as shown in Fig. 5. A cam 48 is mounted on the periphery of the disk 29 and a yoke lever 49 is supported by a loose collar 50 on the shaft 37 so that the upper end of the lever is in the path of the cam. When the disk 29 has completed a revolution the cam will engage the lever 49 and swing the same to one side. The lever being in engagement with the collar 45 will force the same toward the block 47 against the tension of the spring 46 and said collar will pass under the end of a latch 51 which is mounted on the part 47. By tripping this latch the collar is released so that the spring may force it into engagement with the clutch hub 34. From the foregoing it is apparent that whenever the latch 51 is released the clutch collar 45 will engage the hub 34 and the shaft 26 rotated whereby the members 19 are swung, but after the members have completed one full movement and the disk 29 has completed a revolution the cam 48 will operate the lever 49 and disconnect the clutch.

It is obvious that various means might be used for tripping the latch 51, but I prefer to do it automatically and to this end pivot on the block 47 a lever 52 which has connection with the reduced end of the latch 51 as is shown in Fig. 5. The lever 52 projects laterally, as is shown in Fig. 4, and is revolved when the part 47 is revolved. For swinging the lever 52 and tripping the latch I mount in the front wall of the frame 4 a pair of spring pressed pins 53 which may be projected rearward into the path of the lever 52. These pins are engaged by hooks 54 which have their rear ends pivoted to the upper end of a yoke 55 pivoted in the frame 4. A flexible connection 56 is attached to the yoke and extends down through a pipe 57 and mounted on the side of a hanger 58. The hanger is disposed at one side of the frame 4 and carries a housing 59 directed laterally and inwardly toward the row. The housing as is shown in Fig. 9 has pivoted therein a horizontal tripping arm 60. The arm projects from the inner end of the housing over the row and in the path of the plants. When the arm engages a plant it is swung, and having its rear end attached to the connection 56 pulls the latter whereby the yoke 55 is swung and the pins 53 projected into the path of the lever 52.

On the lower end of each member 19 a rocker 61 is pivoted intermediate its ends and has its outer ends attached to the lower end of a coiled spring 62 which is supported by a lug 63. The spring tends to pull the outer end of the rocker upward and throw its inner end downward. An elongated right-angular hoe blade 64 is fastened on the inner end of the rocker, said blade having its length longitudinally to the cultivator. Normally the rocker is held level, as shown at the right hand side of Fig. 2, and in this position the hoe blade is carried inward and past the center of the row. Arriving here the rocker is released permitting the spring to throw the hoe blade into the ground so that when the arm 19 is returned outward a hoeing action will be had. For holding each rocker arm level I provide a rod 65 mounted on the inner side of its member 19 and pivotally connected with the rocker at its lower end. Each rod 65 is bent at its upper end so as to engage an angular releasing lever 66 pivoted on the member 19 and extending down the outer side thereof. The lower end of each lever 66 is engaged by a spring pressed bell crank latch lever 67 mounted on the member 19 and having its inner end projecting toward the frame 4. When one of the members 19 approaches the inner limit of its stroke its lever 67 will engage the frame 4 and thus be swung whereby the lower end of the spring 62 will then be free to operate the rocker 61. When a member 19 approaches the outer limit of its stroke its lever 66 will engage the end of the frame 20 and thus be swung and forced under the latch 67 whereby the rocker is operated and the hoe blade raised.

Each hoe blade has a gap 70 at its center. By leaving this gap open any plants standing within the same when the blade passes across the row will not be disturbed but the blade on each side thereof will chop out the row. In order to cultivate and chop close to a plant an adjustable hoe section 71 may be inserted in the gap and normally pressed forward by a spring 72 as is shown in Figs. 7 and 8. The section 71 has a vertical recess 73 at its center, but its cutting edge is continuous. The spring is very sensitive so that when the hoe is swung inward and the plant is received within the recess 73 or engaged by the section, the latter will yield and not injure the plant; at the same time the hoe blade portions will pass the plant and drop into the soil when the rocker is released. By this arrangement weeds growing close up to the plants will be removed and the row will be thoroughly cleaned. By means of the scroll gears the first hoe blade will reach the plant and complete its operation before the second blade approaches.

What I claim, is:

1. In an apparatus of the character described, a supporting frame, operating members movable transversely and vertically of the frame, means for moving the members vertically, means for moving the members transversely operating at the same time as the first named means, a common means of operation for the moving means normally inoperative, and an automatic release for setting the common operating means in motion, and tools on the operating members.

2. In an apparatus of the character described, a supporting frame, operating members movable transversely and vertically of the frame, means for moving the members vertically, means operating at the same time for moving the members transversely, a common operating means for the moving means normally inoperative, and a plant controlled release for setting the common operating means in motion, and tools mounted on the lower ends of the operating members.

3. In an apparatus of the character described, a supporting frame, vertically and transversely moving operating members mounted in the frame, and means for moving said members, in combination with rockers mounted on the lower ends of the members, hoes carried by the rockers normally above the ground, means for holding the rockers elevated, automatically tripped devices carried by the members for releasing the rocker holding means, and springs attached to the rockers for swinging the same when released.

4. In an apparatus of the character described, a supporting frame, swinging operating members mounted in the frame, and hoes mounted on the lower ends of the members, in combination with scroll gears connected separately with each member for operating one of the members in advance of the other.

5. In an apparatus of the character described, a supporting frame, transversely swinging members mounted in the frame, and hoes carried on the lower ends of the members, in combination with means for swinging the members inward from a given limit at the same time and advancing one of the members whereby it completes its work before the hoe of the other member reaches a plant.

6. In an apparatus of the character described, a supporting frame, transversely swinging members mounted in the frame, and hoes carried on the lower ends of the members, in combination with means for swinging the members inward from a given limit at the same time and advancing one of the members whereby it completes its work before the hoes of the other member reach the plant, said swinging means being normally idle, and a releasing device operated by contact with the plants for setting the swinging means in motion.

In testimony whereof I affix my signature.

RICHARD J. BLANKENSTEIN.

Copies of this patent may be obtained for five cents each, by addressing the "Commissioner of Patents, Washington, D. C."